US010345863B2

(12) United States Patent
Mehandjiysky et al.

(10) Patent No.: US 10,345,863 B2
(45) Date of Patent: Jul. 9, 2019

(54) COVER WITH SHAPE MEMORY MATERIAL

(71) Applicant: HEWLETT-PACKARD DEVELOPMENT COMPANY, L.P., Houston, TX (US)

(72) Inventors: Dimitre (Miki) Mehandjiysky, Houston, TX (US); Dustin L Hoffman, Houston, TX (US); Aki Laine, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 542 days.

(21) Appl. No.: 14/786,325

(22) PCT Filed: Jul. 19, 2013

(86) PCT No.: PCT/US2013/051386
§ 371 (c)(1),
(2) Date: Oct. 22, 2015

(87) PCT Pub. No.: WO2015/009324
PCT Pub. Date: Jan. 22, 2015

(65) Prior Publication Data
US 2016/0127001 A1    May 5, 2016

(51) Int. Cl.
*G06F 1/16* (2006.01)
*A45C 11/00* (2006.01)

(52) U.S. Cl.
CPC ............. *G06F 1/166* (2013.01); *A45C 11/00* (2013.01); *A45C 2011/002* (2013.01); *A45C 2011/003* (2013.01); *A45C 2200/15* (2013.01); *G06F 1/1616* (2013.01)

(58) Field of Classification Search
CPC ........ G06F 1/1616; G06F 1/162; G06F 1/166; G06F 1/1675; A45C 11/00; A45C 2011/002; A45C 2011/003; A45C 2200/15
USPC ....................... 361/679.05, 679.15
See application file for complete search history.

(56) References Cited

U.S. PATENT DOCUMENTS

| 6,430,038 | B1 * | 8/2002 | Helot ............... G06F 1/1616 |
| | | | 248/917 |
| 6,772,879 | B1 | 8/2004 | Domotor |
| 7,509,142 | B2 | 3/2009 | Ditzik |
| 8,194,399 | B2 | 6/2012 | Ashcraft et al. |

(Continued)

FOREIGN PATENT DOCUMENTS

| CN | 101543026 | 9/2009 |
| CN | 101606377 A | 12/2009 |

(Continued)

OTHER PUBLICATIONS

Sams, "Review: Microsoft Wedge keyboard", < http://www.neowin.net/news/review-microsoft-wedge-keyboard >, Aug. 27, 2012.

*Primary Examiner* — Jacob R Crum
(74) *Attorney, Agent, or Firm* — HPI Patent Department

(57) ABSTRACT

A cover includes a cover body, and an arm coupled to the cover body. A shape memory material in the arm may be able to place the arm into a first shape and a second shape. In the first shape, the arm may be adjacent to a display device when the arm is attached to the display device. In the second shape, the arm may form a stand for the display device.

12 Claims, 4 Drawing Sheets

(56) References Cited

U.S. PATENT DOCUMENTS

| | | | |
|---|---|---|---|
| 2002/0044411 A1* | 4/2002 | Iredale | G06F 1/1616 361/679.05 |
| 2004/0160735 A1* | 8/2004 | Ghosh | G06F 1/162 361/679.27 |
| 2007/0201197 A1* | 8/2007 | Hillman | F16M 11/08 361/679.06 |
| 2007/0223184 A1* | 9/2007 | Garrett | G06F 1/1616 361/679.03 |
| 2011/0188189 A1* | 8/2011 | Park | G05B 11/01 361/679.05 |
| 2011/0241998 A1* | 10/2011 | McKinney | G06F 1/1616 345/168 |
| 2012/0033304 A1* | 2/2012 | Kim | G06F 1/1609 359/614 |
| 2012/0037523 A1 | 2/2012 | Diebel et al. | |
| 2012/0068942 A1 | 3/2012 | Lauder et al. | |
| 2012/0261304 A1 | 10/2012 | Busri | |
| 2013/0003284 A1* | 1/2013 | Massaro | G06F 1/166 361/679.28 |
| 2013/0043778 A1 | 2/2013 | Bennett | |
| 2013/0128443 A1* | 5/2013 | Tseng | G06F 1/1616 361/679.12 |
| 2013/0146322 A1 | 6/2013 | Chang et al. | |
| 2013/0170125 A1* | 7/2013 | Liang | H05K 5/0086 361/679.09 |
| 2013/0214661 A1* | 8/2013 | McBroom | G06F 1/1667 312/325 |

FOREIGN PATENT DOCUMENTS

| | | |
|---|---|---|
| JP | 2006163099 | 6/2006 |
| TW | 201318578 A | 5/2013 |

* cited by examiner

COVER WITH SHAPE MEMORY MATERIAL

BACKGROUND

Protective covers may be used to protect the screens of handheld display devices, such as smartphones and tablet computers, from wear and tear.

BRIEF DESCRIPTION OF THE DRAWINGS

Certain examples are described in the following detailed description and in reference to the drawings, in which.

DETAILED DESCRIPTION OF SPECIFIC EXAMPLES

Covers for display devices, such as tablet computers ("tablets") and smartphones, may fold to provide a support or stand for the display device. Such folding covers may not provide sufficient support for typing on an on-screen keyboard of the tablet. Other covers include a keyboard that is accessible when the screen is exposed. Such covers may require an additional stand, such as a kickstand, to support the tablet when the keyboard is in use.

Aspects of the disclosed to may provide a cover that includes a cover body and an arm having a shape memory material. The shape memory material may allow the arm to take a first shape where the cover body protects a screen of the display device. The shape memory material may also allow the arm to take a second shape to form a stand for the display device. The cover may also include a user input, such as a keyboard, on a display-facing side of the cover body, which may be used when the arm forms a stand for the display device. Accordingly, a single component tray protect the display device and provide a stand and user input for using the display device.

Figure 1:
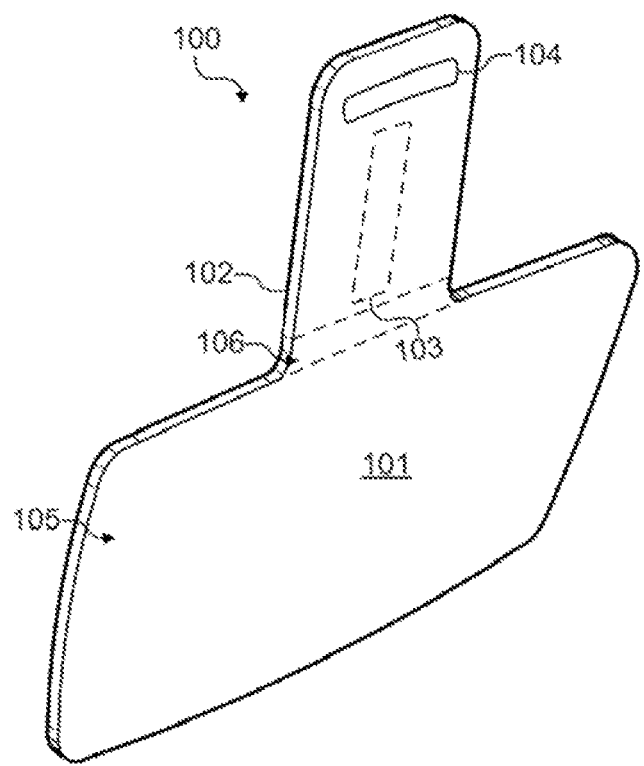
FIG. 1 illustrates an example cover with shape memory material.

FIG. 1 illustrates an example cover 100 including a cover body 101 and an arm 102 with shape memory material 103. In this example, the arm 102 is coupled to the cover body 101 via a hinge 106. In some cases, the arm 102 is coupled to the cover body 101 in an integral manner. For example, the hinge 108 may be a flexible region of the cover 100. In other cases, the arm 102 and cover body 101 are separate pieces of the cover 100. For example, the arm 102 may be coupled to a first portion of hinge 106 and the cover body 101 may be coupled to a second portion of the hinge 106.

In the illustrated example, the arm 102 is narrower than the cover body 101 such that the arm 102 protrudes from the cover body 101. In other examples, the arm 102 may be the same width as the cover body 101, example, cover 100 may be a clamshell-type case for a display device.

The example cover 100 includes a shape memory material 103 in the arm 102. For example, the shape memory material 103 may be embedded in the arm 102. As another example, the shape memory material 103 may be located on, or form a surface of, the arm 102. The shape memory material 103 may have a shape that is controlled by application of actuation energy to the material. For example, the shape memory material 103 may have a first shape below a transition temperature and a second shape above a second temperature. As another example, the shape memory material 103 may be pliable below a transition temperature and enter a memorized shape when raised above a temperature. As a further example, the shape memory material 103 may enter a memorized shape when a sufficiently strong magnetic field is applied to the material. In various implementations, the shape memory material 103 may include a shape memory alloy, a shape memory polymer, or other shape memory material.

Figure 2A:
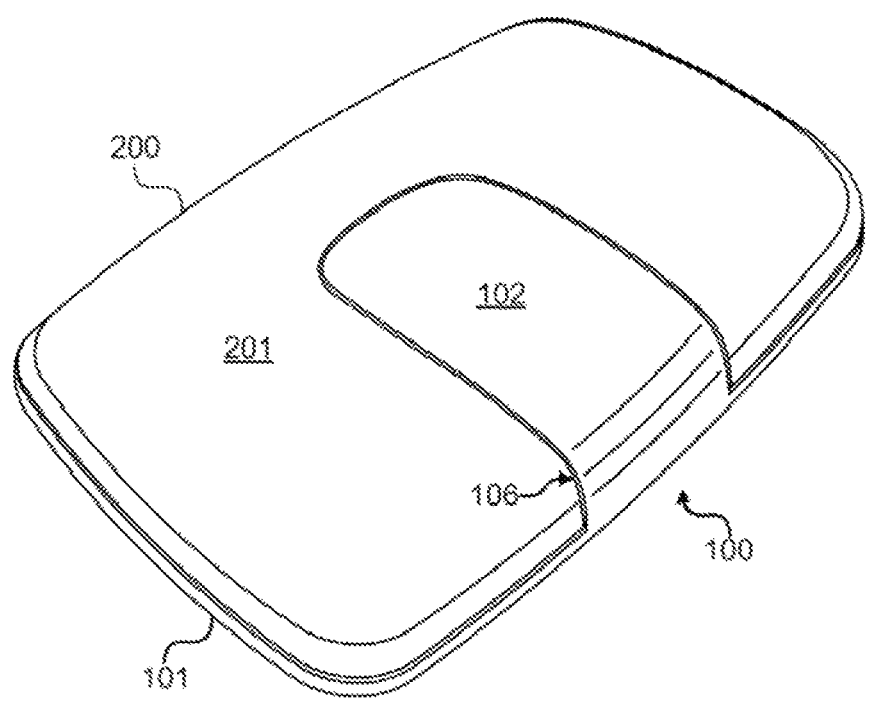
FIGS. 2A-2C illustrate en example cover attached to a display device with an arm in a first shape and a second shape.

The shape memory material 103 may be able to place the arm 102 into a first shape wherein the arm is adjacent to a display device when the arm is attached to a housing the display device. FIG. 2A illustrates the cover 100 connected to a housing 201 of a display device 200 with the arm 102 in the first shape. In the first shape, the arm 102 is adjacent to the rear housing 201 of the display device 200. For example, the arm 102 may be adjacent to the rear housing 201 throughout the entire length of the arm 102. In this shape, the cover body 101 is able to cover the screen of the display device 200. The arm 102 may attach to the display device 200 in various manners. For example, the arm 102 may attach to the display device 200 using magnets or by latching with the rear housing 201 of the display device 200.

Figure 2B:
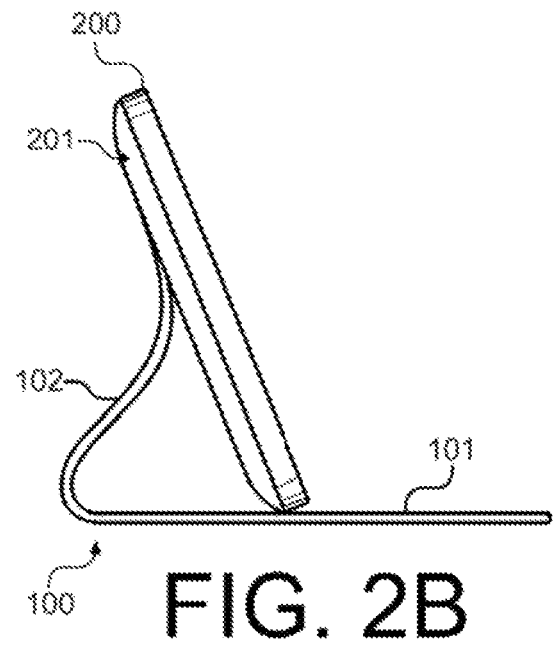
Figure 2C:
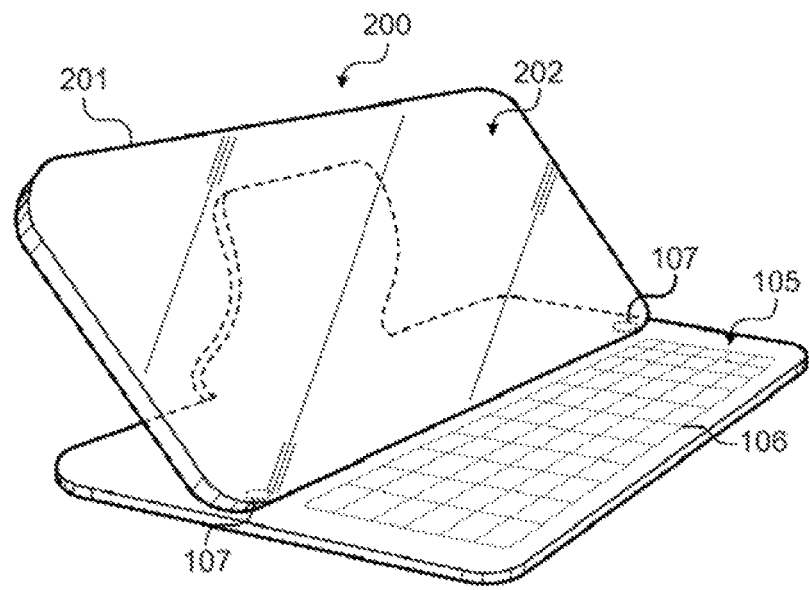

The shape memory material 103 may be able to place the arm 102 into a second shape wherein the arm 102 forms a stand for the display device 200 when the arm 102 is attached to the housing 201. FIGS. 2B and 2C illustrate the cover 100 attached to the housing 201 with the arm 102 in the second shape. In the second shape, the arm 102 supports the rear housing 201 of the display device 200, forming a stand for the display device 200. For example, in the second shape, the arm 102 may have convex curvature and may contact the display device 200 at an arm region distal to the cover body 101.

In some implementations, the shape memory material 103 may exhibit a two-way memory effect. In these implementations, the shape memory material 103 may cause the arm 102 to be in the first shape as a default state. For example, if the shape memory material 103 is heat actuated, the arm may be in the first shape when the material 103 is in a room temperature state. In this example, the shape memory may transition to a heated state to cause the arm 102 to be in the second shape. For example, the second shape may be maintained by continuously powering a heat source coupled to the material 103.

In other implementations, the shape memory material 103 may exhibit a one-way memory effect. In these implementations, actuating the shape memory material 103 may cause the arm 102 to move to the second shape. For example, heating the shape memory material 103 above a transition temperature may cause the arm 102 to move to the second shape. The arm may remain in the second shape when the shape memory material 103 is lowered below the transition temperature. In these implementations, when below the transition temperature, the shape memory material 103 is deformable allow the arm 102 to be placed into the first shape. For example, a user may deform the arm 102 to place the arm 102 into the first shape.

In some implementations, the shape memory material 103 is able to place the arm 102 into a third shape to cause the arm 102 to form a second stand for the display device 200 when the arm 102 is attached to the display device 200. For example, the shape memory material 103 may comprise a first region that may be actuated to place the arm in the first and second shape and a second region that may be actuated to modify the second shape to place the arm in the third shape.

Figure 2D:
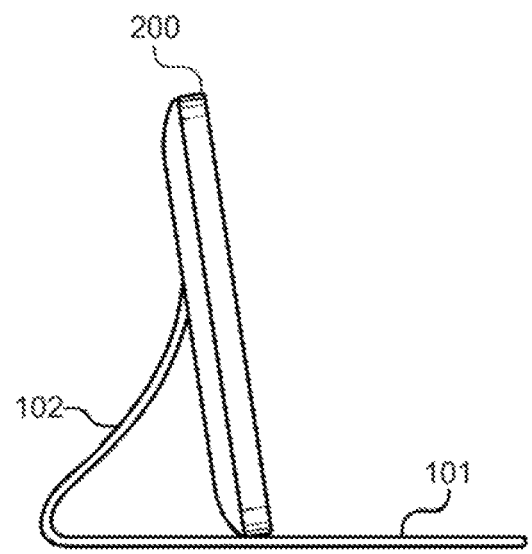
FIG. 2D illustrates a cover with an arm in a third shape.

FIG. 2D illustrates the example cover 100 with the shape memory material 103 placing the arm 102 into a third shape. In this example, the second stand angles the display device 200 at a steeper angle than the first stand illustrated in FIG. 2B. In other examples, the second stand may have a shallower angle or may float the display device 200 above the cover body 101.

In some implementations, a over 100 may further include a user input 106 on a display-facing surface 105 of the cover body 101. For example, the user input 106 may be a keyboard, which may include any number of alphanumeric or functional inputs. In further implementations, the user input 106 may include a touchpad. The user input 106 may include a number of physical keys or a number of touch-sensitive regions on the display-facing surface 105. In some implementations, the user input 106 may be connected to the display 200 via a wired interface. In other implementations, the user input 106 may be connected to the display 200 via a wireless interface, such as a Bluetooth® interface.

The cover 100 may further include a retainer 107 disposed on the display-facing surface 105 of the cover body 101 to retain the display device 200 when the arm 102 is in the second shape and the arm 102 is attached to the display device 200. The retainer 107 may add stability to the stand and may fix the angle of the display device 200. For example, the retainer 107 may be a magnet 107 in the cover body 101 that magnetically couples to a corresponding magnet in the display device 200. As another example, the retainer 107 may be a groove running across the width of the cover body 101 into which an edge of the display device 200 may fit. In further implementations, the cover body 101 may include multiple retainers 107. For example, the user may be able to adjust the angle of the screen 202 by moving the display 200 from one retainer 107 to another.

Returning to FIG. 1, the cover 100 may further induce an electrical connector 104 to connect to the display device 200 when the arm 102 is attached to the display device 200. In implementations including a user input 106, the connector 104 may be used to transmit user input data to the display device 200. In some implementations, the electrical connector 104 may be used to physically attach the arm 102 to the display device 200. For example, the electrical connector 104 may be magnetic and may magnetically couple with a corresponding connector in the display device 200.

In some implementations, the connector 104 may be used to receive control signals for the shape memory material 103. For example, the display device 200 may include a button or software interface to allow a user to actuate the shape memory material 103. In other implementations, the cover 100 includes an input for actuating the shape memory material 103. For example, the shape memory material 103 may be actuated using a button on the cover 101 or a key of a user input 106.

Figure 3:
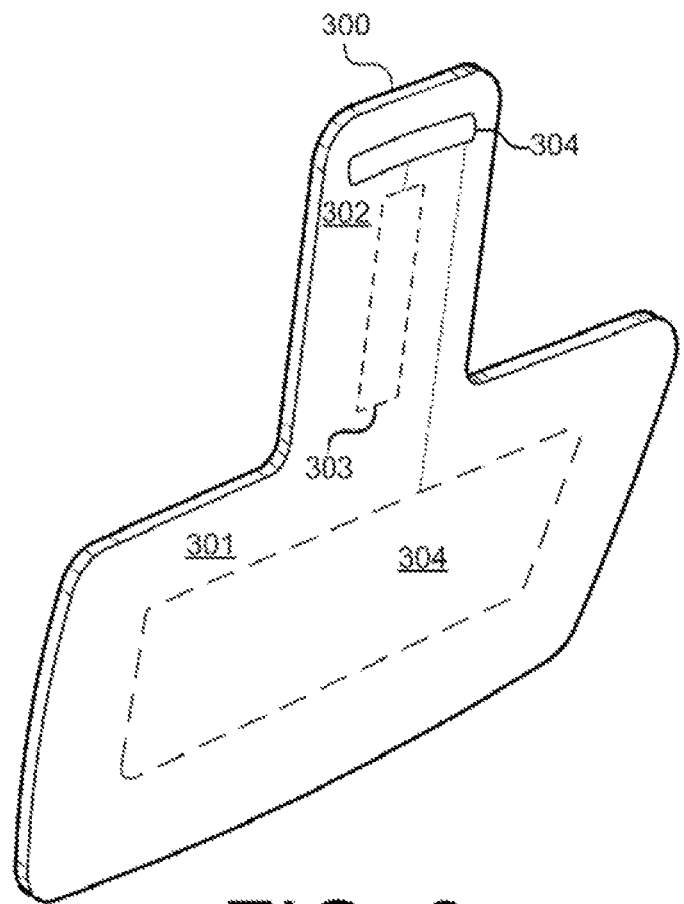
FIG. 3 illustrates a cover including a battery.

FIG. 3 illustrates an example cover 300 including a battery 304. For example, a battery 304 in the cover body 301 or arm 302 may be used to provide power to actuate the shape memory material 303. As another example, the battery 304 may be used to provide power to a connected display device. In some implementations, the battery 304 is connected to an electrical connector 304 to connect to a display device. For example, the connector 304 may be used to transmit power to the battery 304 to recharge the battery. As another example, the connector 304 may be used by the battery 304 to transmit power to the display device to serve as a supplemental power source for the display device.

Figure 4:
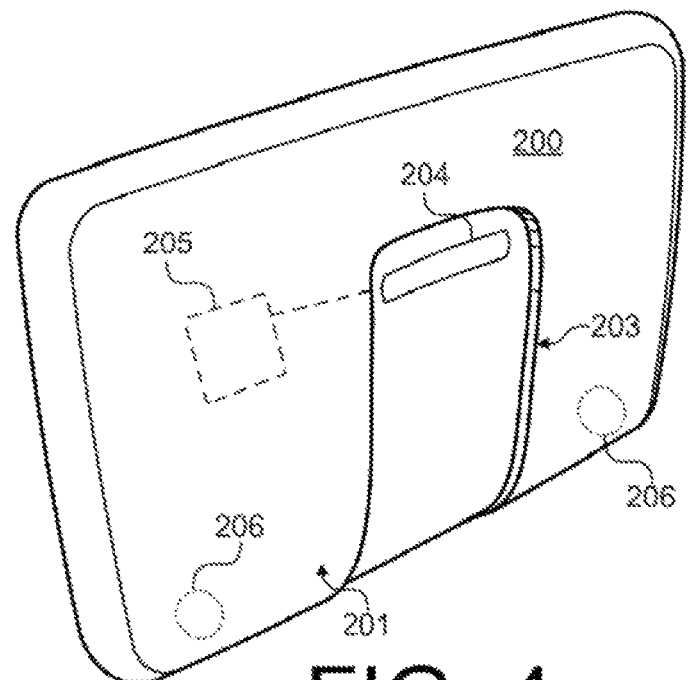
FIG. 4 illustrates a display device including a connector to connect to an arm and a controller to control a shape memory material in the arm.

FIG. 4 illustrates an example display device 200 including a connector 204 to connect to an arm of a cover and a controller 205 to control a shape memory material in the arm. The connector 204 may interface with a connector on a cover, such as the connector 104 of the cover 100 (FIG. 1) or the connector 304 of the cover 300 (FIG. 3). In some implementations, the connector 204 may provide art electrical connection with a cover. In other implementations, the connector 204 may also provide a physical connection with the cover. For example, the connector 204 may include a magnetic connector to magnetically couple with a magnetic connector in an arm of a cover.

The example display device 200 also includes a controller 205 to control a shape memory material in the arm to transition from a first shape where the arm is adjacent to the display device to a second shape where the arm forms a stand for the display devices. For example, the controller 205 may be the central processing unit (CPU) of the display device 200. As another example, the controller 205 may be a dedicated controller to control the cover.

In one implementation, the controller 205 may send a control signal to the cover via the connector 204. In another implementation, the controller 205 may send a control signal to the cover via a wireless interface. In some implementations, the controller 205 may continuously send a control signal to maintain the arm in the second shape. For example, the controller 205 may provide a current to a heating element coupled to the shape memory material to maintain the shape memory material above a transition temperature. In other implementations, the controller 205 may send a control signal to transition the arm into the second shape. For example, the controller 205 may send an instruction to the cover to use a battery in the cover to provide the current to the heating element.

The controller 205 may also receive data from a user input disposed on the cover. For example, the controller 205 may receive keystroke input data from the cover and use the keystroke input data as inputs to programs running on the display device 200.

The connector 204 may also receive power from a battery in the cover. For example, the connector 204 may be connected to an interface to allow the power form the battery in the cover to supplement a battery in the display device 200.

In some implementations, the display device 200 may include groove 203 in a housing 201 of the display device 200 to receive the arm when the arm is in the first shape. For example, the groove 203 may be an indentation having a shape that complements the shape of the arm. In some implementations, the groove 203 may have a sufficient depth such that, when attached and in the first shape, the arm is flush to the remainder of the rear housing 201.

In some implementations, the display device 200 may include a coupler 206 to couple with a retainer of the cover. For example, the coupler 206 may be a magnet in the display housing 201 that couples with a magnet in the cover.

Figure 5:
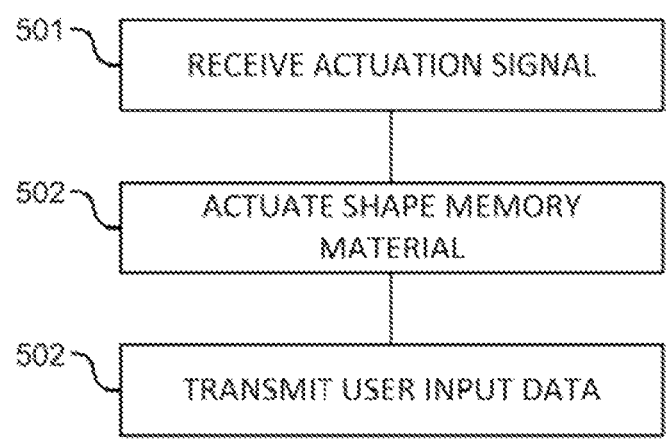
FIG. 5 illustrates an example method of operation of a cover attached to a display device.

FIG. 5 illustrates an example method of operation of a cover attached to a display device. For example, a cover such cover 100 illustrated in FIG. 1 may perform the illustrated method when connected to a display device, such as display device 200 illustrated in FIG. 4.

The method may include receiving an actuation signal from a display device 501. For example, a controller 205 of a display device 200 may transmit the actuation signal through connectors 204 and 104 of a display device 200 and cover 100, respectively. In various implementations, the actuation signal may include a control signal for cover actuation and may include a current to actuate the cover.

The method may also include actuating a shape memory material in a cover arm 501. By actuating, the cover arm transitions from a first shape to a second shape. In the first shape, the arm may be adjacent to a housing of a display device when the arm is attached to the housing of the display device. IN the second shape, the arm may form a stand for the display device when the arm is attached to the housing of the display device. For example, the cover 100 may actuate the shape memory material 103 to transition from the shape illustrated in FIG. 2A to the shape illustrated in FIG. 2B.

The method may further include transmitting user input data to the display device 502. For example, a cover 100 may transmit user input data, such as keyboard input signals or track pad signals, from a user input 106 to a display device 200 through connector 104.

In the foregoing description, numerous details are set forth to provide an understanding of the subject disclosed herein. However, implementations may be practiced without some or all of these details. Other implementations may include modifications and variations from the details discussed above, it is intended that the appended claims cover such modifications and variations.

The invention claimed is:

1. A cover, comprising
a cover body;
an arm, wherein the arm comprises a battery and an electrical connector of the arm coupled to the battery, wherein the electrical connector of the arm is coupled to a display device via an electrical connector of the display device located in a groove of the display device; and
a shape memory material in the arm, the shape memory material responsive to an actuation signal from the display device to change a shape of the shape memory material by applying power from the battery in the arm to place the arm into:
a first shape wherein the arm is adjacent to a housing of the display device when the arm is attached to the housing of the display device; and
a second shape wherein the arm forms a stand for the display device when the arm is attached to the housing of the display device.

2. The cover of claim 1, further comprising:
a flexible hinge region coupling the arm and the cover body.

3. The cover of claim 1, wherein the shape memory material is able to place the arm into a third shape to cause the arm to form a second stand for the display device when the arm is attached to the housing of the display device.

4. The cover of claim 1, further comprising:
a user input on a display-facing surface of the cover body.

5. The cover of claim 1, further comprising:
a retainer disposed on a display-facing surface of the cover body to retain the display device when the arm is in the second shape and the arm is attached to the housing of the display device.

6. A display device, comprising:
an electrical connector of the display device to connect to an arm of a cover body, wherein the electrical connector of the display device is located in a groove of the display device, wherein the arm comprises a battery and an electrical connector of the arm coupled to the battery, wherein the arm is coupled to the display device via the electrical connector of the arm coupled to the electrical connector of the display device located in the groove; and
a controller to generate an actuation signal that changes a shape of a shape memory material by applying power from the battery in the arm to control the shape memory material in the arm to transition from a first shape where the arm is adjacent to the display device to a second shape where the arm forms a stand for the display device.

7. The display device of claim 6, wherein the controller is to receive data from a user input on the cover body.

8. The display device of claim 6, wherein the connector is to receive power from the battery.

9. The display device of claim 6, wherein the groove is to receive the arm when the arm is in the first shape.

10. The display device of claim 6, further comprising:
a coupler to couple with a retainer of the cover body.

11. A method, comprising:
receiving an actuation signal from a display device to change a shape of a shape memory material, wherein the actuation signal is transmitted via an electrical connector of the display device located in a groove of the display device that is connected to an electrical connector of a cover arm; and
actuating the shape memory material in the cover arm, by applying power from a battery in the cover arm, in response to the actuation signal to transition the cover arm from:
a first shape wherein the arm is adjacent to a housing of the display device when the arm is attached to the housing of the display device, to
a second shape wherein the arm forms a stand for the display device when the arm is attached to the housing of the display device.

12. The method of claim 11, further comprising:
transmitting user input data to the display device.

* * * * *